United States Patent [19]

Tsuruoka

[11] Patent Number: 4,740,815

[45] Date of Patent: Apr. 26, 1988

[54] APPARATUS FOR COMPENSATING FOR IRREGULARITIES OF ILLUMINATION FOR A COPIER

[75] Inventor: Ichiro Tsuruoka, Tokyo, Japan

[73] Assignee: Ricoh Company, Ltd., Tokyo, Japan

[21] Appl. No.: 70,558

[22] Filed: Jul. 7, 1987

[30] Foreign Application Priority Data

Jul. 15, 1986 [JP] Japan ............................ 61-166109

[51] Int. Cl.$^4$ ...................... G03B 27/72; G03G 15/28
[52] U.S. Cl. .......................................... 355/8; 355/58; 355/71
[58] Field of Search ................... 355/71, 8, 50, 51, 58

[56] References Cited

U.S. PATENT DOCUMENTS 4,582,418  4/1986  Kozuka et al. ................. 355/58 X
4,641,957  2/1987  Takeda et al. .................... 355/58

Primary Examiner—L. T. Hix
Assistant Examiner—D. Rutledge
Attorney, Agent, or Firm—Oblon, Fisher, Spivak, McClelland & Maier

[57] ABSTRACT

An apparatus for automatically compensating for irregularities of illumination on a photoconductive element of a slit exposure type copier in which a lens is selectively movable along its optical axis and perpendicularly thereto. The apparatus has a simple construction.

1 Claim, 4 Drawing Sheets

APPARATUS FOR COMPENSATING FOR IRREGULARITIES OF ILLUMINATION FOR A COPIER

BACKGROUND OF THE INVENTION

The present invention relates to an apparatus for compensating for the irregularities of illumination for a copier of the type having a lens which is selectively movable along and perpendicularly to an optical axis thereof.

In a slit exposure type copier, when a lens is moved along or perpendicularly to an optical axis thereof for changing magnification and shifting an image, the illumination distribution on a photoconductive element is varied in various manners on account of cos fourth-power rule, as well known in the art. Generally, in a copier of the type described, magnification is changed by moving a lens in different directions depending upon the reference position for laying an original document, i.e., by moving it along its optical axis if the reference position is the center and in an oblique direction if the reference position is the end. Heretofore, the amount of shift of the lens, whether it be parallel to or perpendicular to the optical axis, has been determined unconditionally in correspondence to magnification, and irregularities of illumination on a photoconductive element have been compensated for by picking up the displacement along or perpendicular to the optical axis by means of a cam so as to move a shield plate. However, in the slit exposure type copier wherein the lens is movable in the two directions as desired to implement image shift and magnifications change as described, the prior art approach which unconditionally moves a shield plate for a particular magnification cannot fully compensate for irregularities of illumination on a photoconductive element.

SUMMARY OF THE INVENTION

It is therefore an object of the present invention to provide a simple apparatus capable of compensating the irregularities of illumination on a photoconductive element of a copier in which a lens is movable along a perpendicularly to its optical axis as desired to focus an image on the photoconductive element.

It is another object of the present invention to provide a generally improved apparatus for compensating for irregularities of illumination for a copier.

In order to achieve the above objects, an apparatus for compensating for irregularities of illumination in a slit exposure type copier in which a lens is selectively movable along and perpendicularly to an optical axis of the lens of the present invention comprises two shield plates rotatably supported by a bracket which is mounted on a lens holder which is movable integrally with the lens, angular positions of the shield plates being individually variable to vary a range over which a beam is shielded and, thereby, an illumination distribution on a photoconductive element. A first cam is movable along the optical axis of the lens in synchronism with a movement of the lens along the optical axis, the first cam having a cam surface which changes the angular positions of the shield plates in response to a movement of the shield plates which is perpendicular to the optical axis of the lens. Second cams each has a cam surface which changes a position of the first cam in an up-down direction with respect to the optical axis of the lens in response to the movement of the first cam along the optical axis of the lens.

The above and other objects, features and advantages of the present invention will become more apparent from the following detailed description taken with the accompanying drawings.

DESCRIPTION OF THE PREFERRED EMBODIMENT

Figure 1:
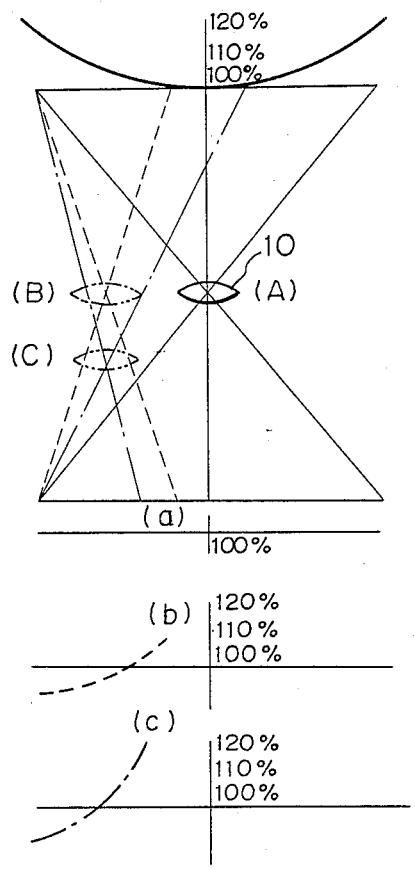
FIG. 1 is a graph showing a relationship between the movement of a lens and the irregularity of illumination on a photoconductive element.

To better understand the present invention, there will be described how the movement of a lens parallel to or perpendicular to its optical axis causes the illumination distribution on a photoconductive element to change at the time of magnification change and image shift due to the cos fourth-power rule, as well as a prior art apparatus for compensation. As shown in FIG. 1, assume that a lens 10 is located at a 1:1 magnification position (A) which is defined on the center line with respect to the width of a photoconductive element. In this condition, in order that the illumination distribution on the photoconductive element may be uniformized by, based on the cos fourth-power rule, compensating for the decrease in the amount of light in peripheral areas, it is necessary that the illumination on an original document be higher in both end portions of the document than in a central portion, as shown at the top of FIG. 1. Generally, in a copier in which the previously mentioned reference position for a document is defined at the center, a change of magnification is effected by moving a lens along its optical axis; in a copier in which the reference position is defined at the end, it is effected by moving a lens in an oblique direction. The amount of movement of the lens, whether it be parallel to or perpendicular to the optical axis, is determined unconditionally in correspondence to magnification and, for this reason, it has been customary to correct illumination on a photoconductive element by picking up a displacement along or perpendicular to the optical axis so as to move a shield plate.

However, in an arrangement wherein the lens 10 is movable from the position (A) to a position (B) of FIG. 1 perpendicularly to the optical axis so as to shift an image on the photoconductive element, the illumination on the photoconductive element is distributed as represented by a dotted line (b) in FIG. 1. Further, when the lens 10 is moved to a position (C) for the change of magnification, the illumination is distributed as represented by a dash-and-dot line in FIG. 1. It follows that, in a slit exposure type copier wherein the lens 10 is selectively movable along and perpendicularly to its axis as desired to perform image shift and magnification change, the prior art compensating method which moves a shield plate based on magnification only is incapable of fully compensating for irregularities of illumination on the photoconductive element.

Hereinafter will be described in detail an apparatus embodying the present invention which solves the problem as discussed above.

Figure 2:
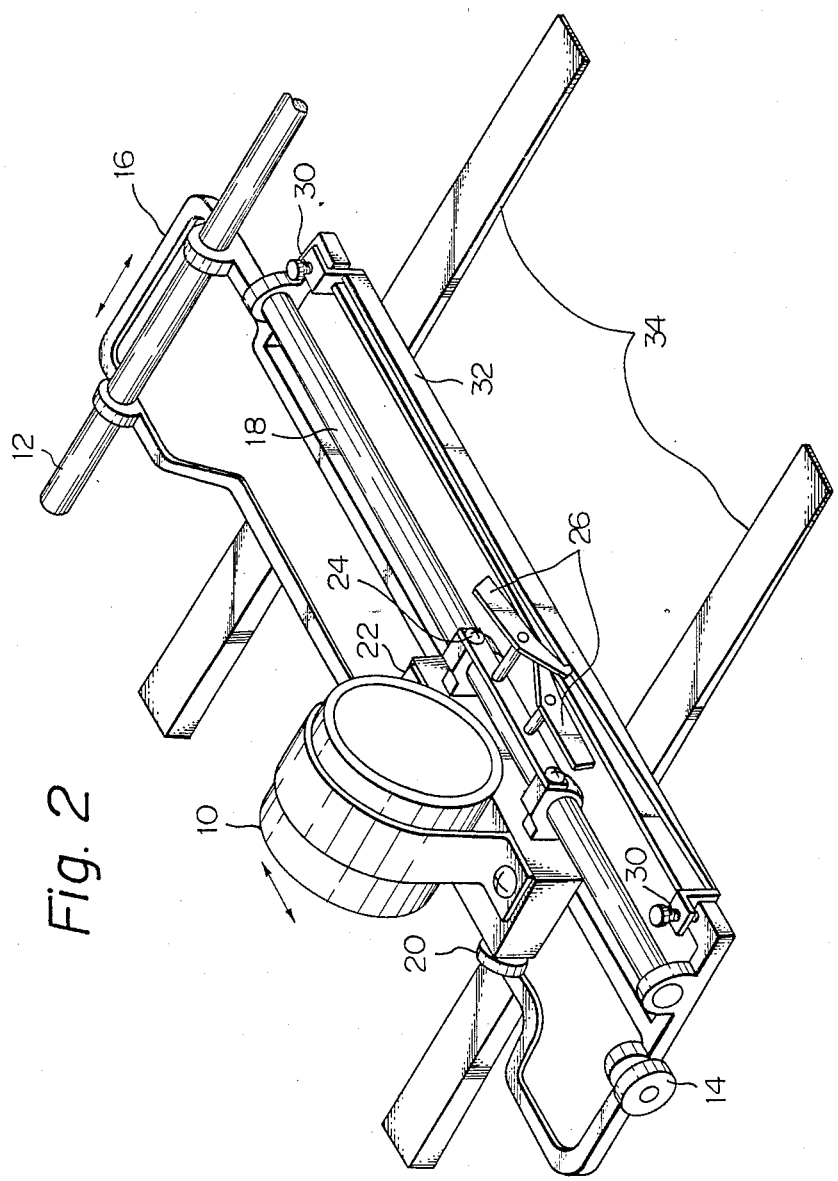
FIG. 2 is a perspective view showing an overall construction of an apparatus embodying the present invention.
Figure 3:
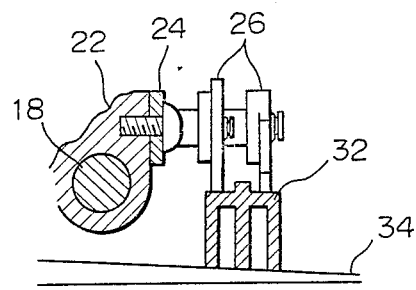
FIG. 3 is a section showing a relationship between shield plates and first and second cams adapted to angularly move the shield plates.
Figure 4:
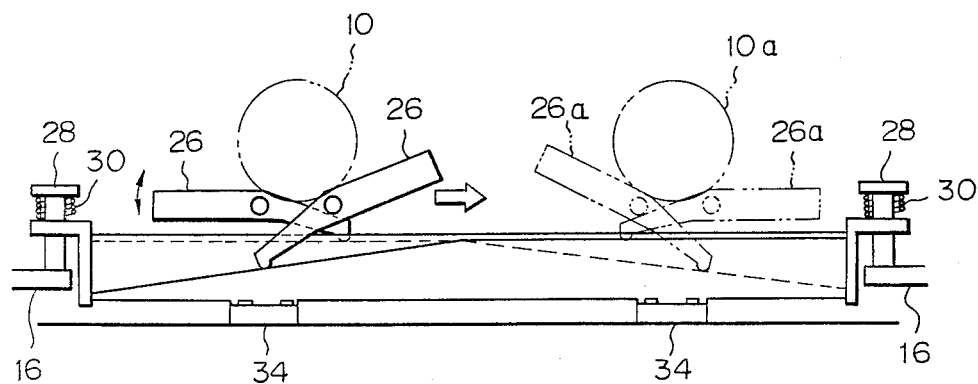
FIG. 4 is a front view of the various members as shown in FIG. 3.

Referring to FIG. 2, an apparatus in accordance with the present invention is shown. The lens 10 is mounted on a holder 22 which is in turn mounted on a carriage 16 by a guide rod 18 and a roller 20 to be movable perpendicularly to an optical axis of the lens 10. The carriage 16 is movable along the optical axis of the lens 10 through a guide rod 12 and a roller 14. At the rear of the lens 10, a bracket 24 is fixed to the holder 22 and provided with two spaced shafts, no numeral. Two shield plates 26 are mounted one on each of the spaced shafts to be rotatable thereabout and in a staggered relationship to each other. As shown in FIGS. 3 and 4, a first cam 32 is mounted on the carriage 16 by pins 28 and springs 30 in such a manner as to be movable up and down. The first cam 32 is adapted to cause the shield plates 26 to rotate independently of each other while the lens 10 is moved perpendicularly to the optical axis.

Second cams 34 are mounted on the base of an optical arrangement and with which the first cam 32 is engaged. In this construction, as the carriage 16 is moved along the optical axis of the lens 10, the first cam 32 is moved up or down causing the angular positions of the shield plates 26 to change (see FIGS. 5A and 5B).

Figure 5A:
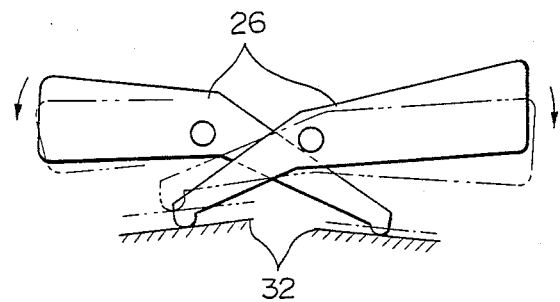
FIGS. 5A and 5B are views showing the operation of the members as shown in FIG. 3.
Figure 5B:
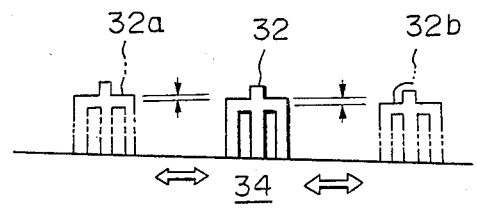

When the lens 10 is held at any of the positions (B) and (C) of FIG. 1, for example, one of the shield plates 26 which is closer to the center than the other is raised due to the configuration of the first cam 32, as represented by solid lines in FIG. 4. Then, as shown in FIG. 1, that portion where the illumination is high is shielded to uniformize the illumination distribution. When the lens 10 is moved in the opposite direction, the shield plates 26 are operated to the opposite position as represented by phantom lines in FIG. 4. As the lens 10 is moved from the position (C) to the position (B) of FIG. 1, the first cam 32 is raised by the second cams 34 to a position 32a as shown in FIGS. 5A and 5B. As a result, the amount of upward movement of the shield plates 26 is reduced, as indicated by phantom lines, so that the amount of a beam which is directed toward the lens 10 and shielded is reduced. This allows the irregularity of illumination at the position (B) of FIG. 1, where the irregularity is less than at the position (C), to be adequately compensated for.

Conversely, when the lens 10 is moved from the position (C) away from an original document, the first cam 32 is lowered by the second cams 34 to a position 32b as shown in FIG. 5B. At the position 32b, the amount of upward movement of the shield plates 26 is increased to in turn increase the amount of the beam shielded.

In summary, it will be seen that the present invention provides an apparatus which, in an imaging system in which a lens is selectively movable along its optical axis and a direction perpendicular thereto, automatically compensates for irregularities of illumination on a photoconductive element.

Various modifications will become possible for those skilled in the art after receiving the teachings of the present disclosure without departing from the scope thereof.

What is claimed is:

1. An apparatus for compensating for irregularities of illumination in a slit exposure type copier in which a lens is selectively movable along and perpendicularly to an optical axis of said lens, comprising:

two shield plates rotatably supported by a bracket which is mounted on a lens holder which is movable integrally with the lens, angular positions of said shield plates being individually variable to vary a range over which a beam is shielded and, thereby, an illumination distribution on a photoconductive element;

a first cam movable along the optical axis of the lens in synchronism with a movement of said lens along said optical axis, said first cam having a cam surface which changes the angular positions of the shield plates in response to a movement of said shield plates which is perpendicular to the optical axis of the lens; and second cams each having a cam surface which changes a position of the first cam in an up-down direction with respect to the optical axis of the lens in response to the movement of the first cam along said optical axis of the lens.

* * * * *